United States Patent [19]

Hanson et al.

[11] Patent Number: 4,558,888
[45] Date of Patent: Dec. 17, 1985

[54] STRIP OF BINDING TAPE

[75] Inventors: Gary R. Hanson, Minneapolis; George R. Rabuse, Sunfish Lake, both of Minn.

[73] Assignee: Minnesota Mining and Manufacturing Company, St. Paul, Minn.

[21] Appl. No.: 719,630

[22] Filed: Apr. 4, 1985

Related U.S. Application Data

[63] Continuation of Ser. No. 533,508, Sep. 19, 1983, abandoned.

[51] Int. Cl.[4] .................... B42D 1/00; B42D 5/04; B42C 9/00; B42B 9/06
[52] U.S. Cl. .................................... 281/23; 206/813; 281/1; 281/21 R; 281/2; 281/5; 412/36; 412/37; 412/901; 428/352
[58] Field of Search .................. 206/59, 813; 281/1, 281/2, 5, 21 R, 23; 412/9, 10, 15, 26, 27, 30, 33, 36, 37, 901; 428/40, 352

[56] References Cited

U.S. PATENT DOCUMENTS

| | | | |
|---|---|---|---|
| Re. 24,906 | 12/1960 | Ulrich | 206/59 |
| 2,000,763 | 5/1935 | Lane | 206/813 X |
| 2,170,147 | 8/1939 | Lane | 206/813 X |
| 2,724,847 | 11/1955 | Krasno | 15/104 |
| 2,822,290 | 2/1958 | Webber | 428/352 |
| 3,121,021 | 2/1964 | Copeland | 117/122 |
| 3,665,543 | 5/1972 | Nappi | 15/215 |
| 3,797,495 | 3/1974 | Schmidt | 428/352 X |
| 4,178,201 | 12/1979 | Power et al. | 412/36 X |
| 4,339,485 | 7/1982 | Shibano et al. | 428/352 X |

Primary Examiner—Paul A. Bell
Attorney, Agent, or Firm—Donald M. Sell; James A. Smith; John C. Barnes

[57] ABSTRACT

A binding tape for binding the shingled edges of sheets has a supple tough and flexible nonwoven fibrous backing coated on one surface with a pressure-sensitive adhesive and with a barrier coat to seal the backing on the other surface. A low adhesion backsize is coated on the backing to permit winding or stacking strips of tape. Tabs adhered to the ends of the strips aid in locating the strips in relation to the shingled edges.

15 Claims, 4 Drawing Figures

STRIP OF BINDING TAPE

CROSS-REFERENCES TO RELATED APPLICATIONS

This application is a continuation of application Ser. No. 533,508, filed Sept. 19, 1983, now abandoned.

BACKGROUND OF THE INVENTION

1. Field of the Invention

This invention relates to an improved tape product and in one aspect to an improved tape for use in binding two or more sheets together to form a pamphlet.

2. Description of the Prior Art

The tape product of the present invention is especially designed for use with a binding machine for binding edges of sheets together which have been placed in parallel offset position such as by shingling to permit the tape to contact each of the sheets to bind the same together.

SUMMARY OF THE INVENTION

The present invention comprises a stack comprising a plurality of strips of tape each coated with a pressure sensitive adhesive positioned in aligned stacked relation, on a support. Each strip has on each end thereof a tab or piece of liner material, at least one of which is formed with an opening, with the openings in aligned position in the stack.

The tape product comprises a nonwoven fibrous flexible backing having one surface thereof coated with a pressure sensitive adhesive and the other surface sealed with a polymer coating to restrict adhesive migration to the backside of the tape. To each end of each strip is attached a tab of material which is adhered to the adhesive at the ends of the strips to afford removal or separation of successive lengths of tape from the stack. At least one tab on each strip is formed with an opening to locate the tab with respect to the taping machine. The strips of pressure sensitive adhesive are stacked with one strip upon the other to supply a plurality of such strips for use with the binding machine. The tape strips are preferably perforated about one quarter (0.25) inch (6.35 mm) from the ends of the strips to permit separation of the ends of the strips and the tabs from the tape strips after the tape strip has been applied to the shingled or offset edges of the sheets to be bound. If the tape strip is not perforated the tabs may have a release coating to afford easy removal from the strips.

DESCRIPTION OF THE DRAWINGS

The present invention will be hereinafter described in greater detail with reference to the accompanying drawing wherein.

DETAILED DESCRIPTION OF THE PRESENT INVENTION

Figure 1:
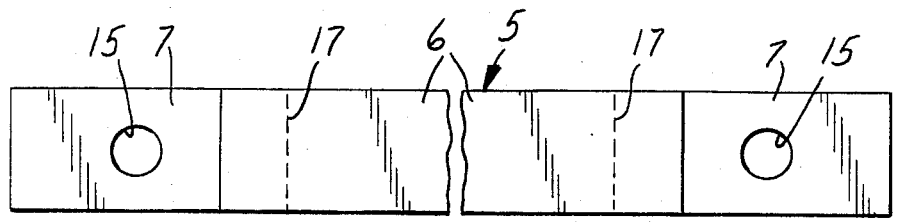
FIG. 1 is a plan view of a stack of pressure sensitive adhesive strips according to the present invention.
Figure 2:
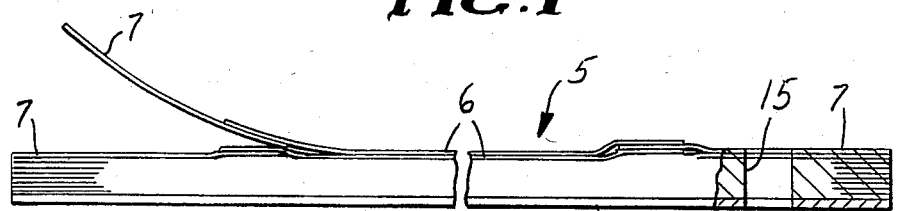
FIG. 2 is a front view of the stack of strips showing one strip lifted at one end from the stack.
Figure 3:
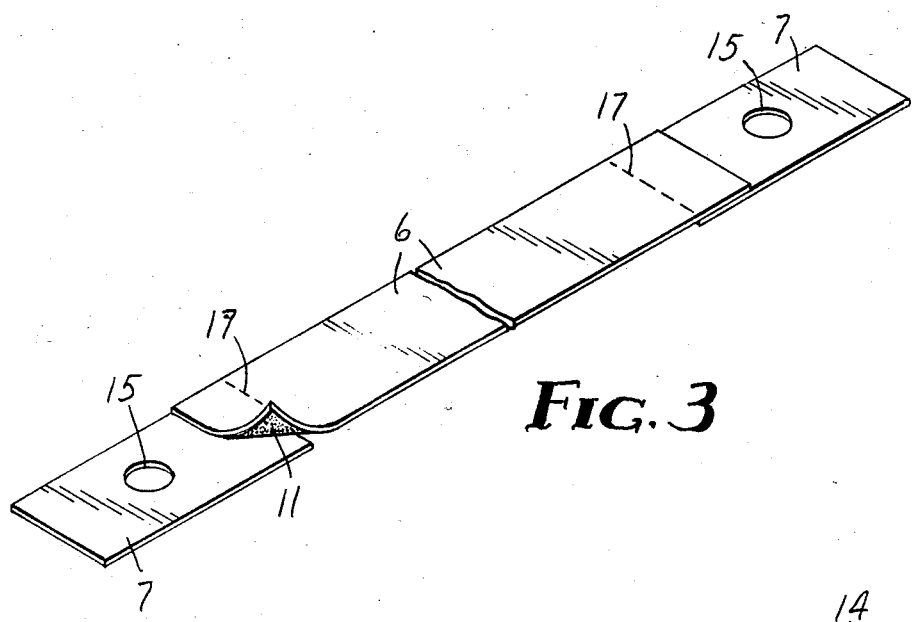
FIG. 3 is a perspective view of a strip of tape.

The present invention is directed to a pressure sensitive adhesive strip for use in binding sheets together. The strips are adapted for use with a binding device which prepares a stack of sheets for binding by shingling or offsetting the edges of the sheets along the edge to be bound and positioning the edges on a platen. The strip of tape of the present invention is then placed over the offset edges and placed in contact with the edges. The tape strip is supple and will conform to the step like treads and risers of the sheets. The package of the present invention comprises a plurality of strips of tape as illustrated in the drawing, each comprising a backing with a coating on one surface of a pressure sensitive adhesive. The backing is preferably formed of a nonwoven fibrous material.

In the drawing, a stack or pad, generally designated 5, of tape strips 6 and removable tabs 7 is illustrated. Each strip 6 has a backing generally designated 10, of preferably a unified nonwoven fibrous fabric carrying a continuous coating of pressure-sensitive adhesive 11. The backing 10 is also coated with a barrier coating 12 on the surface opposite the adhesive coated surface to restrict migration or viscoelastic flow of the adhesive 11 to the opposite surface of the tape. The barrier coating 12 is coated with a release coat or low-adhesion backsizing 14 to permit subsequent release and separation of one strip in the pad from the other when a tab 7 is lifted to peel the tape strips 6 apart.

An example of the backing 10 for the presently preferred embodiment of the adhesive tape and process of making is hereinafter described.

Staple viscose-rayon textile fibers having a length in the range of 1 to 2 inches (25.4 to 50.8 mm), are formed into a continuous fluffy web by a garnett machine or the like, or by a "Rando-Webber" machine (sold by Curlator Corp., Rochester, N.Y.). A typical web is composed of 1½ denier fibers of 1¼ inch length (31.75 mm) adapted to provide a fiber weight in the finished fabric of about 75 to 100 pounds per thousand square yards (40.77 kilograms to 54.36 kilograms per thousand square meters). The nonbundled staple fibers are thereby randomly interlaced into a loose fluffy layer wherein the fibers cross over and under each other so as to be held together by mechanical and frictional forces.

This fluffy fiber web is then fed through the nip of a pair of horizontal square rolls, the lower one of which dips in an aqueous bath of fiber-binding rubbery sizing latex. This results in the fluffy web being compacted to a tissue-like condition and being wetted and impregnated without excess by the sizing solution. The moving web is then dried by engagement with a series of rotating heated drying cylinders located below a forced-draft ventilating hood, thereby unifying the fabric by adhesive interbonding of the interlaced fibers at their crossing points by means of the dried sizing agent, which also imperceptibly coats the individual fibers without filling up the interstices or appreciably affecting the porosity of the product. The sizing also prevents fuzzing. This provides the porous backing upon which the adhesive is to be subsequently applied.

The preferred sizing agents for binding the fibers are water-dispersible rubbery acrylate polymer latices which dry on the fibers to a nontacky state. These are well known in the textile industry. A suitable example is "Rhoplex B-15," sold by Rohm and Haas Co., an aqueous dispersion containing 45% acrylic polymer solids by weight, and which is diluted with water to provide a sizing bath having a polymer solids concentration of about 28%. The concentration is adjusted so that the finished dried fabric will have a polymer sizing weight of 30–70% of the total fabric weight and preferably about equal to the fiber weight.

The presently preferred pressure-sensitive adhesive 11 is a pure rubbery copolymer of isooctyl acrylate and acrylic acid in 94:6 ratio; this type being described in Ulrich's U.S. Pat. No. Re. 24,906. The original solvent dispersion thereof is coated on a heated drum from which the dried polymer is removed and redispersed in a mixed solvent of heptane and isopropyl alcohol (70:30) to provide a 22% solution of coatable viscosity. This procedure eliminates volatile ingredients of the original polymer solution.

This adhesive solution is then coated on a moving liner having an insoluble, heat-resistant, shiny-smooth, antistick surface (such as a paper liner carrying a silicone resin release coating) in a wet coating weight adequate to provide a dry adhesive weight of about 150 pounds per thousand square yards (81.5 kilograms per 1000 square meters). This wet adhesive coated web is promptly drawn into and through a hot air heating oven so arranged that after initial drying of the adhesive to a demi-dry state, the above-described backing web is layed down on the adhesive and becomes adhesively laminated thereto. An air temperature of 100–150 degrees F. (37.8–65.6 degrees Celcius) is preferably employed. Too high a temperature will cause a spongy adhesive coating or make control difficult. The objective at this point is to partially dry the adhesive to a degree that will prevent wicking through the superimposed porous backing fabric. Continuing through the drying oven, the laminated "sandwich" web is further heated to fully eliminate residual solvent and thereby complete the drying. In this example, satisfactory results have been obtained by passing the laminated web through successive oven sections adapted to heat it at 100 degrees F. (37.8 degrees Celsius) for 2½ minutes, then at 150 degrees F. (65.6 degrees Celsius) for 2½ minutes, and finally at 200 degrees F. (93.3 degrees Celsius) for 1½ minutes.

The resultant adhesive sheeting has a caliper thickness of 6 to 9 mils (150 to 225 microns).

The barrier coat 12 is typically a solvent-dispersible rubbery polymer which when dry on the backside of the adhesive-backing laminate forms a non-tacky continuous film. A suitable example is "VAGH #1," supplied by Union Carbide Chemicals Co. which is a vinyl terpolymer composed of 92 parts vinyl chloride, 6 parts vinyl acetate and 2 parts vinyl alcohol which is dispersed in toluene and methyl iso-butyl ketone to a solids concentration of 15% by weight. The coating should comprise of between 1 and 3 grains per 24 square inches (0.0649 and 0.1947 grams per 154.8 square centimeters) of dry VAGH so as to continuously coat the backing over the fibers and adhesive which exists in the interstices of the porous backing leaving a nonporous, non-tacky tape surface. The barrier coat 12 also increases the tensile strength of the tape strip 6 and reduces soiling of the strip.

Preferably, a low-adhesion backsizing 14 is then imparted to the barrier coated surface of the backing fabric. This backsize is so extremely thin as to be imperceptible. This low-adhesion backsizing results in a surface having a reduced adhesion to the tacky pressure-sensitive adhesive and permits linerless rolls of tape or pad arranged strips that can be separated with less effort than would be the case if this backsize were omitted. A preferred low-adhesion backsize 14 is a silicone such as "SYL-OFF" 294 supplied by Dow Corning Corp.

After drying of the backsizing 14 the liner-mounted adhesive-coated web is wound into large jumbo rolls, and is ready for subsequent conversion into tape rolls or strips of desired width or length. The backing is of a nature that permits slitting of tape with straight non-ravelling edges.

The jumbo roll may be unwound and cut transversely into sheets with the length of web cut equalling the desired length for the strips. Strips of paper are then applied along the leading and trailing edge of each sheet with the paper strips overlapping the edges of the adhesive coated sheets by about 0.25 inch (6 mm). The sheets with the paper strips are then layed up in a slab on a support card 16 and the slabs are guillotined into pads of the desired width with each pad having a multiple of tape strips 6, e.g. 20 strips per pad, each with a tab 7 at each end. The strips are perforated as at 17 at the edge of the tabs 7 to afford a cutting of approximately sixty (60) percent of the width of the strip. The perforations afford means to separate the tabs from the strip upon application of the tape strip. Then at least one hole 15 is drilled in a tab 7, of approximately one quarter inch (6 mm) in diameter, centrally thereof. The tape strips are one half to one inch wide (1.27 to 2.54 centimeters) and have tape lengths of 11 inches (27.94 centimeters) when the coated tabs are used or 11½ inches (29.21 centimeters) when the perforated tape and uncoated tabs are used for binding 11 inch paper. The tape for binding other sizes of paper. e.g., DIN size A-4, will have dimensions accordingly.

Figure 4:
FIG. 4 is an enlarged fragmentary sectional view through one embodiment of the tape strip construction.

Alternatively the paper forming the tab material may have a surface coating or low-adhesion backsizing 19 (FIG. 4) similar to that hereinabove described. The coated surface is then applied toward the adhesive. It is then not necessary to use as long a strip of tape as the tape should equal the length of the edges to be bound and the tabs 7 can be pulled readily from beneath the ends of the tape strip.

The slabs are cut into pads and then the opposite edges of the pads are treated with a tack eliminator such as sold under the tradename "TYZOR" TBT sold by E. I. du Pont de Nemours & Co. of Wilmington, Del. The tack eliminator is a n-butyl titanate. Other tack eliminators are calcium carbonate, glass beads, or metal halides. This treatment of the edges with TBT causes a crosslinking of the adhesive on the edges to detackify the adhesive and reduces the migration of the adhesive from the edges of the pads and reduces soiling.

The tape construction is such that when the edges of the sheets being bound are offset at least three times the thickness of the sheets the tape strip can be pressed against the sheets by the fingers or other compliant article pressing on the tape will conform the tape to the shingled surface of the pages. The opening 15 in the tab 7 locates the tab 7 on a locating pin on the taping machine. The adhesive will contact a majority of the exposed surface of the treads of the shingled pages and is extensible and compliant sufficiently to conform about the corner of the risers and treads. Because of the deadness or inelasticity the tape will remain in contact with the treads of the pages upon opening and the adhesive is not contacting and is therefore not forced to peel from the risers. The tape will fold at the riser-tread intersection.

The tape strip permits the bound pages to be opened after binding and the pages all lay flat as the tape backing affords a hinge for each sheet which is at the very edge of the pages and the fibers in the backing do not fatigue. The tape has sufficient drape to remain in position without placing the adhesive under a peel force and upon closing the bound document the tape need not be pressed against the pages again to maintain the pages bound in book form.

Having thus described the invention with respect to a preferred embodiment it is also contemplated that tape strips with the tabs could be placed side by side on a sheet of release coated paper. Such tape strips would not require the backsizing. Other modifications may be made in size or composition without departing from the invention as defined in the appended claims.

We claim:

1. A strip of binding tape comprising
   a strip of porous non-woven fibrous backing of polymeric material,
   a coating of an acrylic pressure-sensitive adhesive on one surface of the backing, and
   means defining a tab on at least one end of a said strip covering at least a portion of said adhesive, said tab being separable from said strip and having an opening therein for alignment of a said strip.

2. A strip of binding tape according to claim 1 wherein a low-adhesion backsize is placed on said backing of polymeric material to permit winding and stacking of a plurality of said strips.

3. A strip of binding tape according to claim 2 wherein the sides of said strip have a tack eliminator coated thereon.

4. A pad of pressure-sensitive adhesive tape strips positioned in a stack for use in binding sheets together, said strips comprising
   a backing of a nonwoven fibrous material covered on one surface with an acrylic copolymer pressure-sensitive adhesive, barrier coat means on the opposite surface of said backing for restricting adhesive migration through the backing, and a low-adhesion backsize on said barrier coat means,
   each strip having attached to each end thereof against a portion of the adhesive a strip of tab material to form a tab, at least one of said tabs being formed with an opening therein with the openings in the tabs being in aligned position.

5. A pad according to claim 4 wherein the sides of the stack of strips are treated with a tack eliminator.

6. A pad according to claim 5 wherein the tack eliminator affords a crosslinking of the adhesive exposed on the edge of the tape strips to restrict adhesive migration from the edges of the pad.

7. A pad according to claim 5 wherein the tack eliminator is tetra n-butyl titanate.

8. A strip of binding tape conprising
   a porous nonwoven fibrous backing of polymeric material,
   a coating of an acrylic pressure sensitive adhesive on one surface of the backing,
   a barrier layer on the opposite surface of the backing to cover the surface of the backing and interstices between the fibers to restrict adhesive migration through said backing, and wherein a tab is adhered one to each end of a said strip with the adhesive at the ends of said strip contacting a surface of the tab.

9. A strip of binding tape according to claim 8 wherein said barrier layer is a polymer to seal the backing and make it nonporous and nontacky.

10. A strip of binding tape according to claim 8 wherein said tab is coated on the surface contacting said adhesive with a low-adhesion backsize.

11. A strip of binding tape according to claim 8 wherein said strip of tape is perforated transversely adjacent the edges of the tabs contacting the adhesive.

12. A strip of binding tape according to claim 8 wherein at least one of said tabs has an opening formed therein to receive a locating pin.

13. A strip of binding tape according to claim 6 wherein said strip of tape is perforated transversely adjacent the edges of the tabs contacting the adhesive.

14. A strip of binding tape according to claim 1 wherein a low-adhesion backsize is placed on said barrier layer to permit winding and stacking of a plurality of said strips.

15. A strip of binding tape according to claim 8 wherein said backing comprises a nonwoven web of viscose rayon 1½ denier fibers bound by a rubbery acrylate polymer.

* * * * *

UNITED STATES PATENT AND TRADEMARK OFFICE
CERTIFICATE OF CORRECTION

PATENT NO. : 4,558,888

DATED : December 17, 1985

INVENTOR(S) : Gary R. Hanson and George R. Rabuse

It is certified that error appears in the above-identified patent and that said Letters Patent is hereby corrected as shown below:

Col. 4, line 43, After "a" insert -- tetra --.

Signed and Sealed this

Sixth Day of May 1986

[SEAL]

Attest:

DONALD J. QUIGG

Attesting Officer

Commissioner of Patents and Trademarks